Dec. 18, 1945.  T. W. CLIFFORD  2,391,132
OPTICAL PROJECTION APPARATUS
Filed Sept. 20, 1943  7 Sheets-Sheet 1

Dec. 18, 1945.  T. W. CLIFFORD  2,391,132
OPTICAL PROJECTION APPARATUS
Filed Sept. 20, 1943  7 Sheets-Sheet 2

Inventor
T W CLIFFORD
By
Attorneys

Dec. 18, 1945.　　　T. W. CLIFFORD　　　2,391,132
OPTICAL PROJECTION APPARATUS
Filed Sept. 20, 1943　　　7 Sheets-Sheet 3

Inventor
T. W. CLIFFORD
By
Evm Holcomb Blair
Attorneys

Dec. 18, 1945.   T. W. CLIFFORD   2,391,132
OPTICAL PROJECTION APPARATUS
Filed Sept. 20, 1943   7 Sheets-Sheet 4

Inventor
T. W. CLIFFORD
By
Attorneys

Dec. 18, 1945.   T. W. CLIFFORD   2,391,132
OPTICAL PROJECTION APPARATUS
Filed Sept. 20, 1943   7 Sheets-Sheet 5

Inventor
T.W. CLIFFORD.
By
Attorneys

Dec. 18, 1945.    T. W. CLIFFORD    2,391,132
OPTICAL PROJECTION APPARATUS
Filed Sept. 20, 1943    7 Sheets-Sheet 6

Inventor
T. W. CLIFFORD
By
Attorneys

Patented Dec. 18, 1945

2,391,132

UNITED STATES PATENT OFFICE 2,391,132

OPTICAL PROJECTION APPARATUS

Thomas William Clifford, Leicester, England, assignor to Taylor, Taylor & Hobson Limited, Leicester, England, a company of Great Britain Application September 20, 1943, Serial No. 503,149
In Great Britain July 20 and 24, 1942

12 Claims. (Cl. 88—24)

This invention relates to optical projection apparatus for projecting an image of the profile of an object on to a projection screen.

One main object of the invention is to provide an improved practical construction of apparatus of this kind to render the apparatus readily adaptable to the profile investigation of a wide variety of objects.

For this purpose it is desirable to provide a number of interchangeable projection lenses having different focal lengths but all having approximately the same distance between nodal plane and image plane. A more detailed object of the invention therefore is to provide adjustments for the various parts of the apparatus to permit the substitution of such interchangeable lenses one for another and to enable full use to be made of such interchangeability.

A further object is to provide an improved mechanical remote transmission system whereby the various adjustments of the apparatus can be controlled from a remote point, such as an observation point close to the projection screen.

The apparatus is preferably of the known type in which the projection lens is mounted on a main supporting base with its optical axis horizontal and the object whose profile is to be imaged is mounted on a work support towards the rear end of the base, the projection rays from the lens being deflected upwardly by a small inclined mirror in front of the lens and then downwardly again by a large mirror mounted at a height above the small mirror on to a horizontal projection screen mounted on the base in front of the small mirror.

Such apparatus is commonly employed for testing the accuracy of manufacture of small parts, and in view of this and of the large size of the apparatus itself it is often found most convenient to install the apparatus close to the main machines of the factory, with the result that the mirrors require frequent cleaning in order to ensure projection of clear images. In the apparatus as hitherto constructed, it has been necessary to remove the projection screen in order to lower the large mirror from its supporting framework into a position in which it is accessible for cleaning purposes.

A further object of the invention therefore is to provide an improved mounting for the large mirror in such apparatus to facilitate cleaning without the necessity for any extensive dismantling of the apparatus.

Further objects of the invention will be apparent from the appended claims and from the following description of the accompanying drawings, in which

Figure 10:
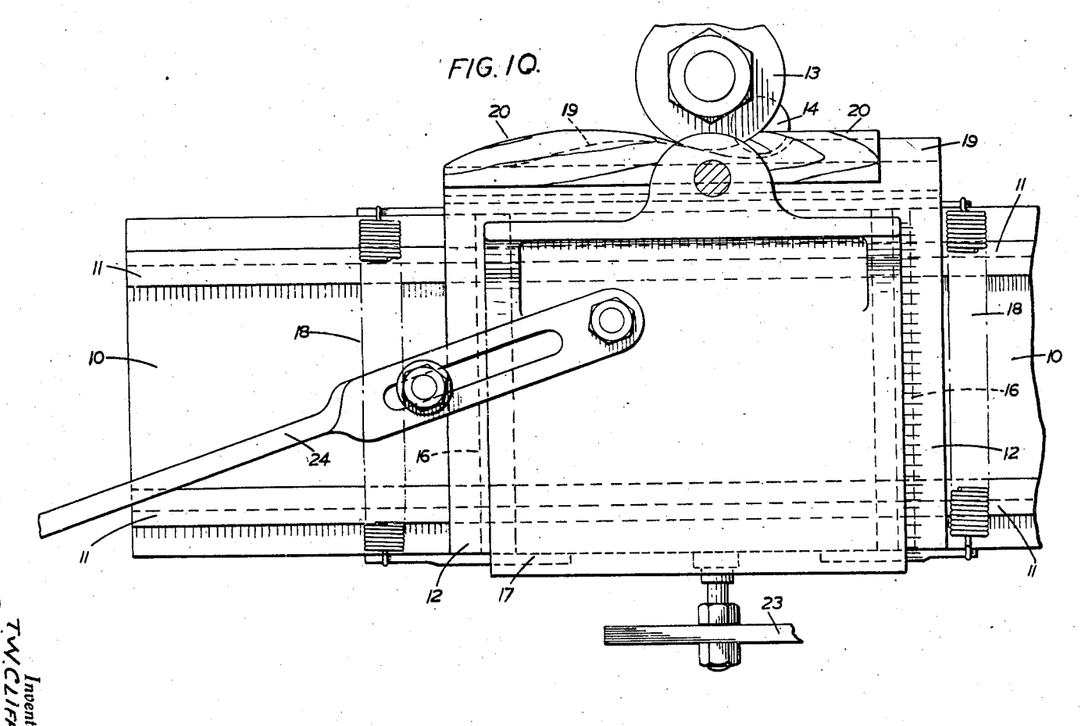
Figures 10 and 11 are respectively a plan view and a front view of the supporting base on an enlarged scale.
Figure 11:
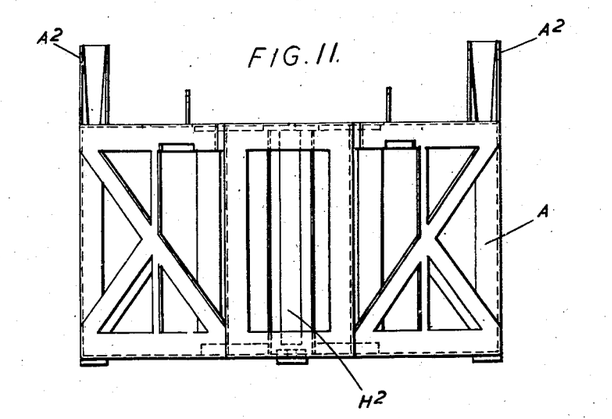
Figure 12:
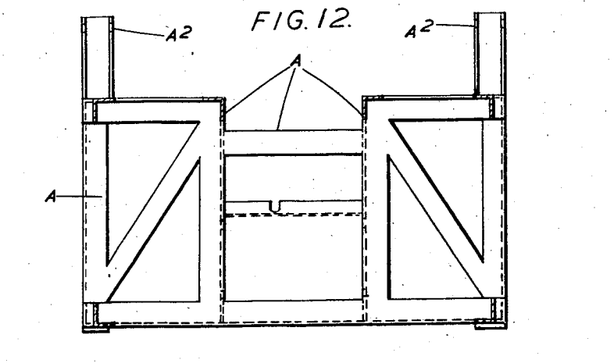
Figure 12 is a sectional view on the line 12—12 of Figure 10.

In this construction the apparatus consists of a fixed supporting base A fabricated mainly from L-section girders welded toegther in the shape shown in Figures 10-12. Horizontal guide rails $A^1$ are mounted on this base A and extend from near its front end to its rear end, and a carriage B carrying supports for the projection lens C, for a work table D and for an illuminating device E is mounted to slide along these guide rails. The projection beam from the lens C passes horizontally forward to a small inclined mirror F mounted on a bracket $F^1$ on the fixed supporting base A near the front end of the guide rails $A^1$. The rays are deflected upwardly by this small mirror F to a large mirror G, mounted above and slightly to the rear of the small mirror, and are thence deflected downwardly to a horizontal projection screen H on a table $H^1$ carried by a vertical spindle $H^2$ suitably journalled in the front end of the base A.

Figure 13:
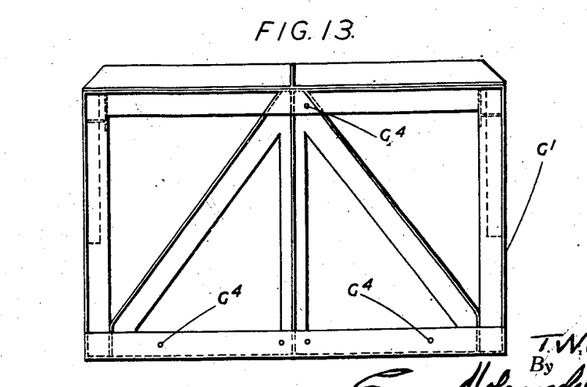
Figure 13 is an end view of the framework for carrying the large mirror.

The large upper mirror G is carried by a girder framework $G^1$ having the shape in side view of a suitably strutted inverted L. A top end view of this framework $G^1$ is shown in Figure 13, wherein the three fixing holes $G^4$ for the mirror support can be seen. The lower end of this framework $G^1$ is journalled to the base A on a horizontal pivot axis $A^2$, which lies transversely to the optical axis of the projection lens C close to the bracket F¹ carrying the small inclined mirror F. This pivot axis A² is located above the level of the projection screen H, so that the framework G¹ and the large mirror G can be swung down from the operative position, shown in full lines in Figure 1, into an inoperative cleaning position wherein the framework G¹ lies across the top of, but clear of, the projection screen, and the mirror G is readily accessible for cleaning purposes from the space between the front edge of the screen H and the mirror in its lowered position. Cleaning can thus be carried out after merely lowering the mirror framework G¹, without disturbing the mirror mounting on the framework or the projection screen or other parts of the apparatus.

In order to hold the mirror framework G¹ in its operative position a main supporting framework G² is provided, consisting of an upright girder pivoted to the base at A² and a tie girder for anchoring the top of the upright girder to the rear end of the base. These framework girders G¹G² straddle the guide rails A¹ and the parts carried thereby and are so shaped as to afford ready access from the sides to those parts. The fixed framework G² also carries lifting mechanism G³ to facilitate raising and lowering the mirror framework G¹ about its pivot. A curtain (not shown) is hung from the upper parts of the frameworks around the projection screen H to cut off the surrounding light and thus enable the projected image to be more readily seen.

Figure 4:
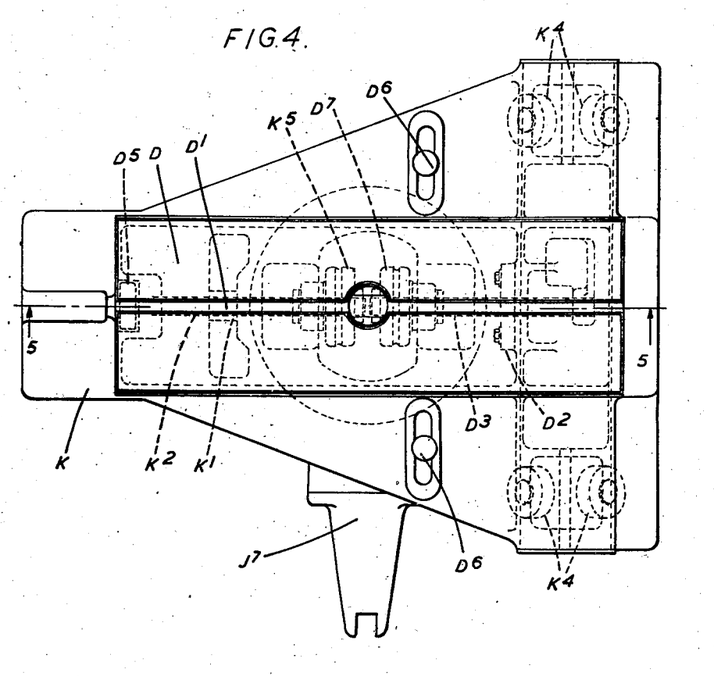
Figure 4 is an enlarged plan view of the work support shown in Figures 1-3.
Figure 5:
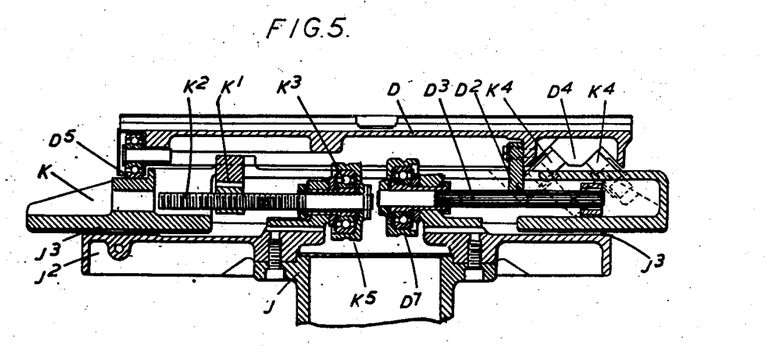
Figure 5 is a transverse section on the line 5—5 of Figure 4.

The work table D, which bears an inverted T-groove D¹ or other fitting for receiving the object whose profile is to be investigated, is carried by a work support, consisting of a vertical cylindrical member J mounted in suitable bearings suspended from the carriage B in such a manner that it can be rotated through a small angle about its vertical axis and can also be raised or lowered along such axis by means of a screwthread drive indicated, somewhat diagrammatically, at J¹. At its upper end this cylindrical member J is provided with a flange J² (see Figures 4 and 5), bearing a slideway J³, which in the normal position of the member J lies horizontally at right angles to the optical axis of the projection lens C, but can be swung with the member through a small angle on either side of such normal central position. A cross-slide K is mounted on the slideway J³ and is driven along it by means of a nut K¹ engaging with a screwthreaded shaft K² mounted in bearings K³ carried by the work support J.

The work table D is mounted on the cross-slide K in such a manner that it can be adjusted thereon in a horizontal direction at right angles to the slideway J³ between the work support J and the cross-slide, that is in a direction which lies parallel to the optical axis of the lens C when the work support J is in its normal position. This movement can conveniently be effected by means of a rack D² on the work table engaging with a pinion D³ on the work support J, the pinion being long enough to allow for the movement of the cross-slide K along its slideway J³. The work table D is suitably guided on the cross-slide K for example by a rib D⁴ at one side of the work table running on pairs of inclined thrust rollers K⁴ on the cross-slide with a simple roller D⁵ at the other side of the work table running on the surface of the cross-slide. Means indicated at D⁶ are provided for clamping the work table D to the cross-slide in its position of adjustment.

It will be clear that with this arrangement the object whose profile is to be examined can be raised or lowered and moved laterally to the appropriate position relative to the optical axis of the lens C, and can also be swung through a small angle about a vertical axis. In addition the object can be moved nearer to or further from the projection lens as may be required, such movement however taking place along a slightly inclined line if the work support J has been rotationally adjusted from its central position.

At its rear end the carriage B is provided with a support E¹ for the illuminating device E, and this support bears on its upper surface an arcuate slideway E² struck about a vertical axis through a point on the optical axis of the lens C. Such vertical axis may conveniently coincide with the axis of rotation of the work support J. The illuminating device E itself is mounted to slide along this slideway E² and consists of a lamp housing containing a lamp with a small filament and a collimator for directing a collimated beam of light from such filament towards the object on the work table D. The adjustment of the device E along the slideway E² is provided to enable the object to be illuminated at a small angle to the optical axis of the lens C, as may be required for instance when the object consists of a screwthread. The collimated beam is thus directed past the object towards the projection lens and serves to define the desired profile as the edge of the shadow cast by the beam of light.

The projection lens C itself is carried by a fitting C¹ which is detachably mounted on a cross-slide C² which can be adjusted transversely to the optical axis on a slideway on a lens support C³ mounted on the carriage B.

In practice a number of alternative projection lenses of different focal length are provided, each carried by a fitting which can be mounted on the cross-slide C² when required in place of the lens previously employed. These interchangeable lenses are all such as to have approximately the same axial distance between nodal plane and image plane, so that substitution of one lens for another will not materially alter the effective diameter of the projection beam in the neighbourhood of the small inclined mirror F, and will thus make it unnecessary to increase the size of the mirror beyond a convenient relatively small size.

Figures 1, 6:
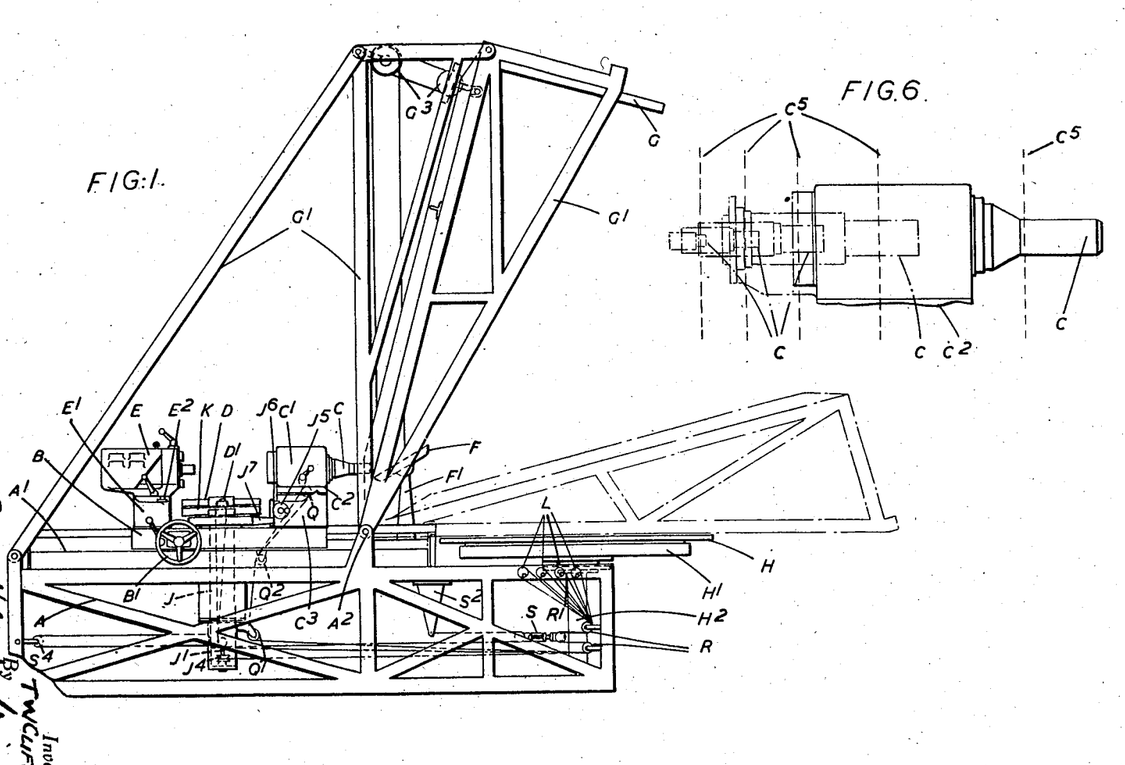
Figure 1 is a side view of the complete apparatus.
Figure 6 is an enlarged view of the lens support.

In practice a set of five alternative lenses will amply suffice to meet all usual requirements. Figure 6 shows diagrammatically the positions relative to the cross-slide C² occupied by the five lenses C of one convenient set, having focal lengths respectively of, say, 2", 4", 6", 10" and 20", the vertical dotted lines C⁵ in this figure indicating the positions of corresponding nodal planes of the five lenses C.

The axial adjustment of the carriage B along the guides A¹ and the adjustment of the work table D parallel or nearly parallel to the optical axis will together permit accurate focussing of the image on the screen H for each of the interchangeable lenses. Since however such adjustment of the work table D will, if the work support J has been rotationally adjusted to one side or the other of its central position, move the object slightly to one side of the optical axis, it is desirable to be able to move such axis sideways to a corresponding extent. The cross-slide C² is provided for the purpose of permitting such slight transverse adjustment to be made. The movement however will be a small one and it will not be necessary to move the inclined mirror F or the top mirror G or the projection screen H correspondingly, these parts being made large enough to cover the lateral adjustment of the lens.

The alternative lenses are designed to give an accurate flat and undistorted image for an incident beam inclined to the optical axis at any angle within the small range of rotational adjustment of the illuminating device and a suitable lens for this purpose is that described in the copending United States patent application Serial Number 451,755, filed July 21, 1942.

It will be clear that with the various adjustments above described, the apparatus can be used for profile projection of a wide range of different types and sizes of object. In all cases it will give an image of the profile of the section of the object cut by a plane at right angles to the optical axis of the lens C, but such plane can if desired lie at a small angle to an axis of the object, and the incident beam can be swung through a small angle to the optical axis of the lens to suit the shape of the object. For example, if the object consists of a screwthread, it can be mounted with its axis at right angles to the optical axis (in which case an axial section of the thread will be imaged) the illuminating beam being swung round to an angle suited to the helix angle of the thread, for example the mean helix angle between root and crest of the thread. Alternatively the thread can be swung round with its axis inclined to the optical axis at an angle equal to the complement of the helix angle, in which case, with an incident beam along the optical axis, a section of the thread at right angles to the helix will be imaged. It will be appreciated that the provision of the cross-slide K is especially useful for screwthread investigation in that it enables the turns of the screwthread to be brought consecutively into the correct position for imaging and moreover makes it possible to measure the pitch of the thread if the appropriate measuring indicator is provided on the cross-slide control. A variety of other possible uses of the apparatus for profile projection will be readily apparent.

The various adjustments may be controlled by handwheels or hand levers close to the parts adjusted and accessible from the sides of the base, suitable clamping means being provided to hold the parts firmly in their positions of adjustment. Alternatively, or in addition, means may be provided for remote control of any or all of the adjustments from the front of the apparatus close to the projection screen, so that the operator can make the necessary adjustments without moving from his observation position in front of the apparatus.

Such remote control may be effected in various ways, but in one convenient form employs cables passing around pulleys connected to the parts to be adjusted and at their ends to helically grooved drums at the control point. Two alternative such remote control arrangements are shown respectively in Figures 7 and 9, the preferred form of Figure 7 being diagrammatically indicated also in Figure 1, whilst Figure 8 shows one of the helically grooved drums L in section.

Figures 2, 3, 8:
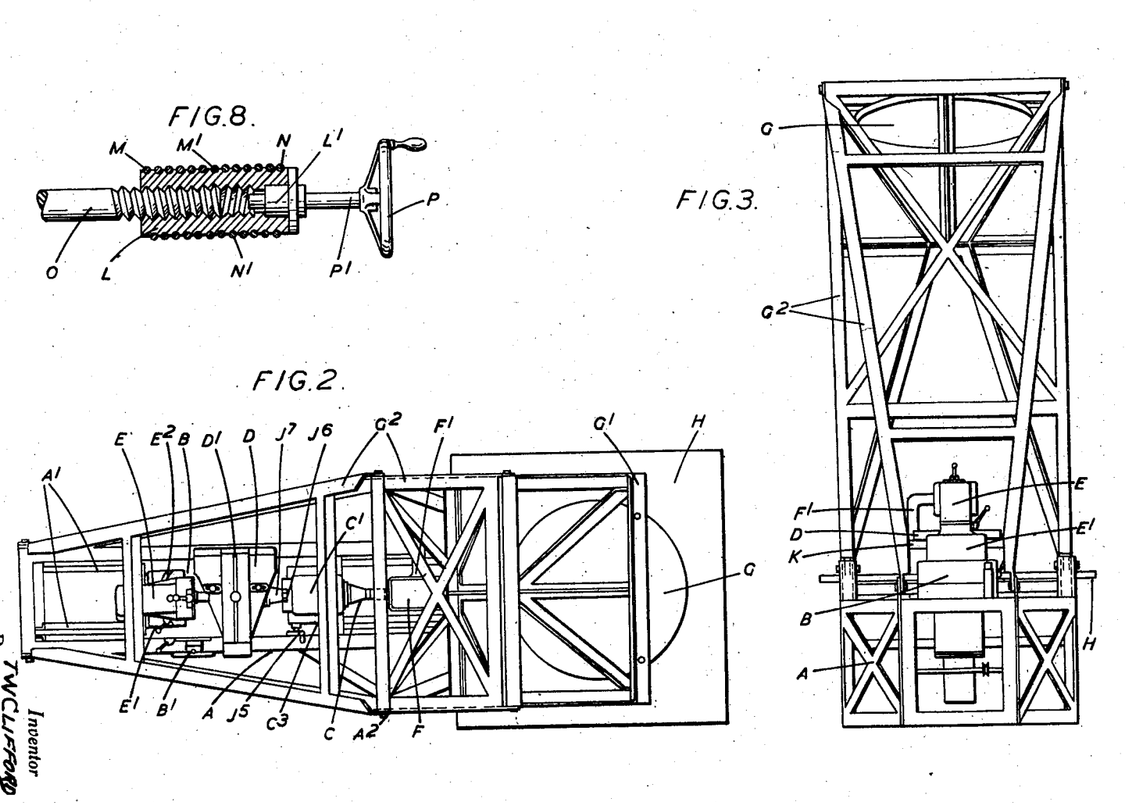
Figures 2 and 3 show the apparatus respectively in plan and in rear elevation.
Figure 8 is a sectional view of a part of the remote control system.

As shown in Figure 8, the two ends MN of each cable are attached to opposite ends of the drum L and are wound round the drum so as to leave it respectively at points $M^1N^1$ at approximately the same axial position on the drum, the two parts of the cable thus running together from the drum to the part controlled. The drum is internally screwthreaded at the same pitch as the external helical groove, and is mounted on a fixed screwthreaded shaft O. The drum is rotated by means of a handwheel P whose spindle $P^1$ is keyed to a boss $L^1$ fixed to the drum. Thus rotation of the handwheel P to effect the desired adjustment will rotate the drum L and will at the same time cause it to move along the fixed shaft O, thus holding fixed in space the points of the departure $M^1N^1$ of the two parts of the cable from the drum throughout the movement.

Since the adjustable parts (except for the carriage B itself which is adjusted along the guide rails $A^1$ by the handwheel $B^1$) are all mounted on the carriage, it is necessary to provide the remote control cables with means for compensating for the carriage movement, so that such movement will not cause undesired adjustment of the parts or leave the cables loose. Two alternative compensating arrangements for this purpose are illustrated respectively in Figures 7 and 9. In both arrangements four remote control cables are provided. One of these passes over idler pulleys $Q^1Q^2$ on the carriage B to a pulley Q which controls the transverse adjustment of the cross-slide $C^2$ carrying the lens. A second operates a pulley $J^4$ controlling the screwthread $J^1$ for raising and lowering the worktable D. The other two operate the two pulleys $K^5$ and $D^7$ respectively for driving the screwthreaded shaft $K^2$ and the pinion $D^3$ for adjusting the cross-slide K on the work support J and the work table D on the cross-slide K. The rotational movement of the work support J is effected by a hand-wheel $J^5$ (for convenience mounted on the lens support $C^3$). This hand-wheel effects lateral movement of a pin $J^6$ engaging in the forked end of a projection $J^7$ from the flange $J^2$ of the work support. The movement of the illuminating device E around its arcuate guide $E^2$ is also effected directly by hand.

Figure 7:
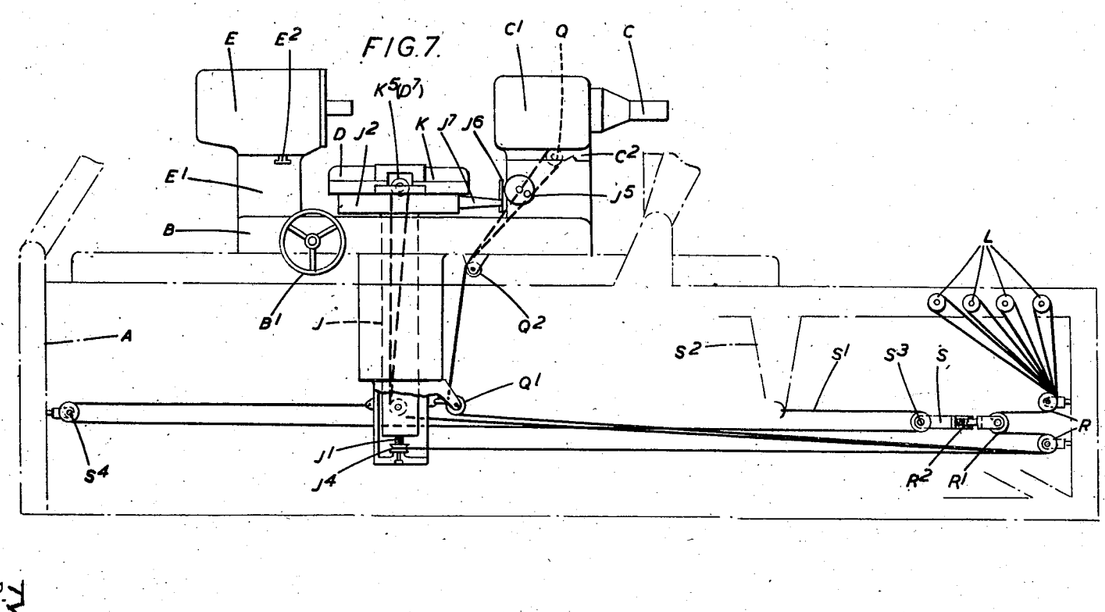
Figure 7 illustrates diagrammatically a preferred form of remote control for the various adjustments of the apparatus.

In the arrangement of Figure 7 the compensation for the carriage movement in the cable drives is obtained, each cable from its grooved drum L is taken over idler pulleys R on stationary spindles at the front end of the base A and also over a further pulley $R^1$ connected through a tensioning spring $R^2$ to a member S common to all pulleys. The cable leads to the pulley $R^1$ are horizontal and the member S is arranged to move at half the speed of the carriage B, thus providing the necessary compensation. The movement of the member S may be effected in various ways, but in the arrangement shown is determined by a cable $S^1$ which is attached at one end to a stationary bracket $S^2$ and after passing over a pulley $S^3$ on the member S and an idler pulley $S^4$ on a stationary spindle at the rear end of the base is attached to the carriage B, the various parts of the cable $S^1$ all lying horizontally.

Figure 9:
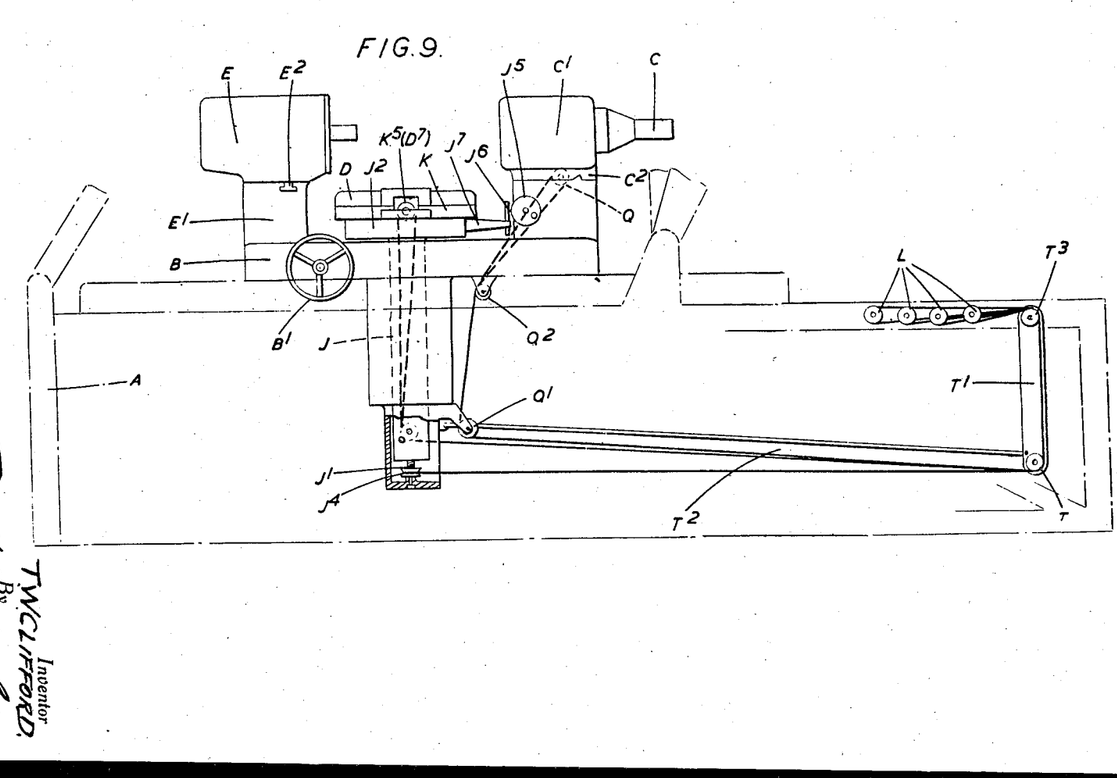
Figure 9 is a diagram of an alternative remote control system.

In the alternative arrangement of Figure 9, the effective lengths of the cables are maintained constant by passing them over pulleys T at the pivot point between a pair of rigid arms $T^1T^2$, one of which $T^1$ is pivoted at its other end to the fixed base A, whilst the other $T^2$ is pivoted to the carriage B adjacent to the point of entry of the cables to the carriage, the cables from the drums L passing over pulleys $T^3$ at the pivot point between the arm $T^1$ and the base A. Thus as the carriage B moves the two arms swing about their pivots, the various parts of the cable always lying substantially parallel to the two arms.

It will be appreciated that the foregoing arrangements have been described by way of example only and may be modified in various ways within the scope of the invention.

What I claim as my invention and desire to secure by Letters Patent is:

1. Profile projection apparatus, comprising a fixed base, a work table for carrying the object whose profile is to be investigated, means for illuminating the object, a projection screen, a projection lens arranged for projecting an image of the profile of the object on the projection screen, a work support mounted on the fixed base and on which the work table is mounted, means for adjusting the work support on the fixed base both rotationally through a small angle about a vertical axis and translationally along such vertical axis, means for adjusting the work table horizontally on the work support in a direction which in one position of angular adjustment of the work support lies parallel to the optical axis of the projection lens, a support for the projection lens mounted on the fixed base, and means for adjusting the lens support horizontally on the fixed base through a small distance transversely to the optical axis of the lens.

2. The combination with the features set forth in claim 1, of means whereby the work-table can also be adjusted on the work support in a horizontal direction transverse to the optical axis of the projection lens.

3. Profile projection apparatus, comprising a fixed base, a work table for carrying the object whose profile is to be investigated, a projection screen, a projection lens for projecting an image of the profile of the object on to the projection screen, an illuminating device for directing a collimated beam of light horizontally past the object to the projection lens, a support for the projection lens, a work support on which the work table is mounted, a carriage on which the illuminating device and the lens and work supports are mounted, means for adjusting the carriage on the fixed base in the direction of the optical axis of the projection lens, means for adjusting the work support on the carriage both rotationally through a small angle about a vertical axis and translationally along such vertical axis, means for adjusting the work table horizontally on the work support in two mutually perpendicular directions one of which in one position of angular adjustment of the work support lies parallel to the optical axis of the projection lens, and means for adjusting the lens support horizontally on the carriage through a small distance transversely to the optical axis of the lens.

4. The combination with the features set forth in claim 3, of means whereby the illuminating device can be angularly adjusted on the carriage through a small angle about a vertical axis adjacent to the axis of rotation of the work support.

5. The combination with the features set forth in claim 1, of means whereby at least some of the various adjustments can be remotely controlled from a position adjacent to the projection screen.

6. The combination with the features set forth in claim 1, of means whereby the work table can also be adjusted on the work support in a horizontal direction transverse to the optical axis of the projection lens, and means whereby the two adjustments of the worktable, the translational adjustment of the work support and the transverse adjustment of the lens support can be remotely controlled from a position adjacent to the projection screen.

7. The combination with the features set forth in claim 3, of means whereby at least some of the various adjustments can be remotely controlled from a position adjacent to the projection screen such means incorporating pulleys and flexible transmission elements passing over the pulleys, and means for compensating for the change in length of such transmission elements due to movement of the carriage.

8. The combination with the features set forth in claim 3, of means whereby the work table can also be adjusted on the work support in a horizontal direction transverse to the optical axis of the projection lens, and means whereby the two adjustments of the work table, the translational adjustment of the work support and the transverse adjustment of the lens support can be remotely controlled from a position adjacent to the projection screen, such means incorporating pulleys and flexible transmission elements passing over the pulleys, and means for imparting movement to at least one pulley associated with each transmission element so correlated with the movement of the carriage as to afford compensation for the change in length of such transmission element due to the carriage movement.

9. Profile projection apparatus comprising in combination a base, a work support mounted on the base towards the rear end thereof for carrying the object whose profile is to be projected, a projection lens mounted on the base with its optical axis horizontal, a small inclined mirror mounted on the base in front of the projection lens for deflecting the rays therefrom upwardly, a large mirror mounted at a height above the small inclined mirror for deflecting the rays therefrom downwardly, a horizontal projection screen mounted on the base in front of the small mirror for receiving the image of the profile of the object projected by the lens after reflection by the two mirrors, a framework carrying the large upper mirror and pivoted to the base about a horizontal axis located behind the projection screen and above the level thereof, and means for holding such framework in the operative position.

10. Profile projection apparatus as claimed in claim 9, in which the means for holding the mirror-carrying framework in the operative position comprises a main supporting framework which extends upwardly from the base and serves as a support for lifting gear for raising and lowering the mirror-carrying framework about its pivot.

11. Profile projection apparatus as claimed in claim 9, in which the means for holding the mirror-carrying framework in the operative position comprises a framework element pivoted to the base behind the projection screen and extending upwardly from such pivot, an inclined tie element connecting the top of such framework element to the rear end of the base, and means for carrying lifting gear for raising and lowering the mirror-carrying framework about its pivot.

12. A profile projection apparatus comprising a fixed supporting base, a work supporting carriage movably supported on said base, guide rails on said base for movably supporting said carriage on said base for horizontal adjustment thereon, a work table adjustably supported on said carriage for supporting the object whose contour is to be projected, illuminating means adjustably supported on said carriage for illuminating said object, a projection lens means adjustably supported on said carriage for projecting a screen image of said object, a projection screen adjustably mounted in a horizontal plane on said base to receive the projected image of the profile of the said object, a fixed inclined mirror on said base to reflect the projection beam in a vertical plane, a second adjustable mirror pivotally mounted above said inclined mirror to reflect said projection beam upon said screen, means supported on a horizontal axis on said base for supporting said second mirror in operative position with respect to the projection beam and to said screen and control means supported on said base adjacent to said screen for adjusting said carriage, said work table and said lens means for adjusting the image of said object on said screen.

THOMAS WILLIAM CLIFFORD.